United States Patent
Boxall et al.

(12)

(10) Patent No.: US 6,263,456 B1
(45) Date of Patent: Jul. 17, 2001

(54) SYSTEM FOR REMOTE DEBUGGING OF CLIENT/SERVER APPLICATION

(75) Inventors: Alan Stewart Boxall, Markham; Madeline Fok, Torononto; Eric Labadie, Toronto; Murray James Nesbitt, Vancouver; Gin Yee Ng, Richmond Hill; Ronald Wessels, Mississauga, all of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/004,134

(22) Filed: Jan. 7, 1998

(30) Foreign Application Priority Data

May 9, 1997 (CA) .................................................. 2205096

(51) Int. Cl.[7] ..................................................... H02H 3/05
(52) U.S. Cl. ............................... 714/31; 714/25; 714/38; 714/46; 709/217; 709/218
(58) Field of Search .............................. 714/31, 25, 38, 714/46; 709/217, 218, 219

(56) References Cited

U.S. PATENT DOCUMENTS

| | | | |
|---|---|---|---|
| 5,371,746 | * 12/1994 | Yamashita et al. ................... | 371/19 |
| 5,630,049 | * 5/1997 | Cardoza et al. ................. | 395/183.01 |
| 5,787,245 | * 7/1998 | You et al. ........................ | 395/183.14 |
| 5,794,046 | * 8/1998 | Meier et al. .......................... | 395/704 |
| 5,809,248 | * 9/1998 | Vidovic ................................ | 395/200 |
| 5,815,653 | * 9/1998 | You et al. ........................ | 395/183.14 |
| 5,819,093 | * 10/1998 | Davidson et al. .................... | 395/704 |
| 5,892,941 | * 4/1999 | Khan et al. ...................... | 395/500.44 |

* cited by examiner

Primary Examiner—Ayaz Sheikh
Assistant Examiner—Firmin Backer
(74) Attorney, Agent, or Firm—David A. Mims, Jr.

(57) ABSTRACT

A system for remotely debugging application code on client/server systems. The system comprises a kicker program and a debugging engine installed on the server and a debugging user interface installed on a client machine. When a call is made to the application code on the server machine, the kicker program starts the debugging engine to debug the application code. The kicker program stops the debugging engine when the application code has been stepped through or returns. The debugging engine includes means for remotely starting the debugging user interface installed on the client machine.

15 Claims, 2 Drawing Sheets

SYSTEM FOR REMOTE DEBUGGING OF CLIENT/SERVER APPLICATION

FIELD OF THE INVENTION

The present invention relates to distributed systems, and more particularly to a system for remote debugging of client/server applications in the distributed computing environment.

BACKGROUND OF THE INVENTION

Many new applications are being written in a client/server configuration where execution of the application is split between a client and a server.

In the initial stages of development the developer may test and debug the server part of the application by running it locally. To complete the testing, the server part of the application must be installed and run on the server.

Two problems are typically encountered during testing of the application code on the remote server. First, the developer is required to go to the server machine and use the debugger on the server in order to debug the application code on the server. In a distributed or networked computer environment this is both inconvenient and awkward because the developer is required to interact with two or more machines. In most cases, the machines are not physically located in the same room. Secondly, the developer is first required to manually find the application code in the server executable files running on the server before the debugging operation can be commenced. Typically this involves starting the server machine under the control of the debugger or using the "process attach)" feature of the debugger. Next the developer needs to step through "disassembled" code that is part of the server executables until the application code is located. It will be appreciated that this procedure is time consuming and error prone. With such an arrangement, it is not possible to debug the application code on the server without first stepping through additional server code which interfaces the application to the client machine.

The present invention addresses these shortcomings by providing a system which allows the application code on the server to be debugged remotely.

BRIEF SUMMARY OF THE INVENTION

The present invention provides a system for remotely debugging application code on client/server systems. It is a feature of the present invention that the system detects execution of a particular program and in response begins to debug the application code associated with the program on the server.

The system according to the present invention comprises a debugger and a kicker program (debug.dll) on the server. When the debugger is started on the server, the debugger looks for the kicker program. If the debugger sees the kicker program, it switches to a mode of operation for debugging the application code only. The debugger also starts the user interface for the debugger resident on the client machine that originated the call to run the application code.

The "kicker program" comprises a debug.dll which is installed on the server. The kicker program is called by wrapper code on the server just before the application code is called and immediately after the application code returns. The kicker program is responsible for starting the debugger on the server machine and communicating to the debugger information about the application code on the server to a debugger user interface running on a client machine.

In a first aspect, the present invention provides a debugging system for a networked computer system having a server machine, one or more client machines having means for initiating a call to the server machine and a network for transferring information between the server machine and the client machines, said debugging system comprising: (a) processing means for processing calls from said client machines to an application program on said server machine, said processing means including means for invoking said application program and means for returning from said application program, and said means for invoking including means for generating a first control output prior to said application program being invoked, and said means for returning including means for generating a second control output after said application program returns; (b) debugging means for debugging the application program on said server machine; (c) controller means for controlling said debugging means, said controller means including means responsive to said first control output from said processing means for initiating operation of said debugging means and means responsive to said second control output from said processing means for terminating operation of said debugging means; and (d) said means for initiating operation of said debugging means including means for passing information to said debugging means for identifying the application program to be debugged.

In a second aspect, the present invention provides a method for remotely debugging an application program in a networked computer system having a server machine, one or more client machines having means for initiating a call to the application program on the server machine and a network for transferring information between the server machine and the client machines, said method comprising the steps of: (a) initiating a call from the client machine to the application program on the server machine; (b) processing said call to the application program on the server machine, said processing including invoking a debugging session for the application program on the server machine, said debugging session being invoked prior to execution of the application program on the server machine; (c) terminating the debugging session upon execution of the application program.

In a third aspect, the present invention provides a computer program product for use in a networked computer system having a server machine, one or more client machines having means for initiating a call to the server machine and a network for transferring information between the server machine and the client machines, said computer program product comprising: a recording medium; means recorded on said medium for instructing said computer system to perform the steps of, (a) initiating a call from the client machine to the application program on the server machine; (b) processing said call to the application program on the server machine, and. said processing including invoking a debugging session for the application program on the server machine, said debugging session being invoked prior to execution of the application program on the server machine; (c) terminating the debugging session upon execution of the application program.

BRIEF DESCRIPTION OF THE DRAWINGS

Reference will now be made to the accompanying drawings, which show a preferred embodiment of the present invention, by way of example, and in which.

DETAILED DESCRIPTION OF THE PREFERRED EMBODIMENT

Figure 1:
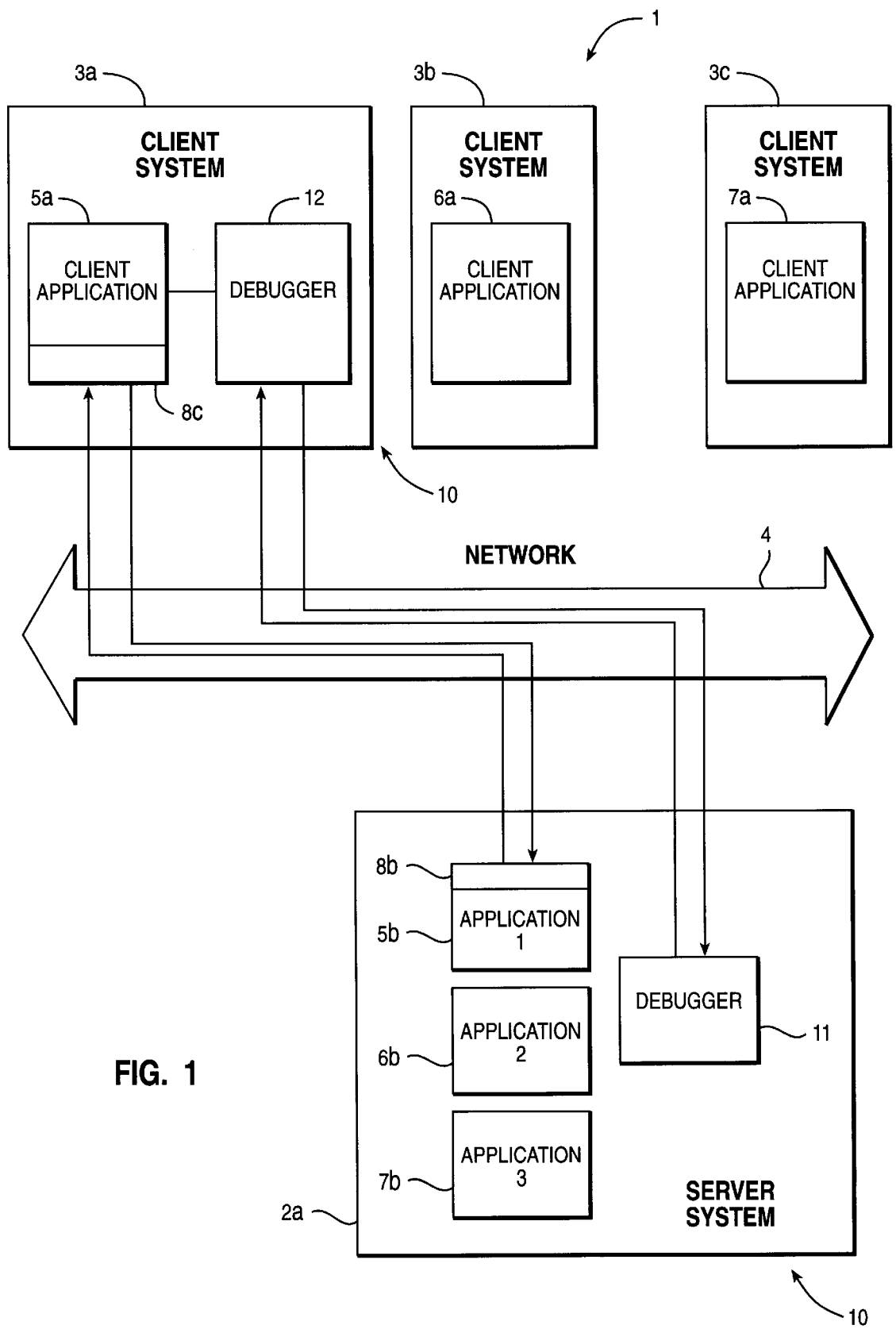
FIG. 1 shows in diagrammatic form a system for remotely debugging client/server applications on a distributed or networked computing environment according to the present invention.

Reference is made to FIG. 1 which shows a distributed or networked computing environment 1 suitable for a system 10 for remotely debugging client/server applications according to the present invention. The distributed computing environment 1 has one or more server systems 2, shown individually as 2a, and client systems, shown individually as 3a, 3b, 3c. The server 2 and client systems 3 are connected together through a network 4, for example, a Local Area Network (LAN). The network 4, in turn, may be connected to other LAN's or Wide Area Networks (WAN's) not shown.

The server 2 typically comprises a computing station having powerful processors and high capacity mass storage devices. The server 2 typically utilizes a multi-tasking platform, e.g. UNIX, allowing multiple applications to run concurrently. Each client system 3 comprises a data processing station executing an application program. In a distributed computing environment, the client systems 3 execute application programs 5, 6, 7 comprising two pieces: application code 5a resident on the client 3a and application code 5b resident on the server 2a.

When a client/server application is built there are two pieces to the application, one part runs on the client and the other part runs on the server. Each piece 5a, 5b in the client/server application 5 (6 or 7) includes wrapper code 8a, 8b, respectively. The wrapper code 8 is built by a tool known in the art as a "builder" and takes care of the communications between the client system 3a and the server 2a. The effect of this is that when the application code 5a running on the client 3a makes a local function call, the wrapper code 8a (also known as a "proxy") with the application code 5a turns the function call into a communications request to the server 2a. The server 2a, in turn, includes an Object Request Broker (ORB) which routes the call to invoke the wrapper code 8b for the application code 5b running on the server 2a. The wrapper code 8b then calls the application code 5b to do the required work in response to the call from the application code 5a running on the client machine 3a. When the application code 5b completes its processing control is returned to the wrapper code 8b and then over the network 4 back to client machine 3a with the results generated by the application 5b.

In the initial stages of development the developer may test and debug the server part 5b of the application program 5 by running it locally. To complete the testing, the application code 5b must be installed and run on the server 2a. This means that the developer must go to the server machine 2a and use a debugger on the server to debug the application code 5b. In a distributed or networked computer environment this is both inconvenient and awkward because the developer is required to interact with two or more machines. In most cases, the client 3a and server 2a machines are not physically located in the same room. The present invention provides a system indicated generally by reference 10 for remotely debugging client/server application programs. As will be described, the remote debugging system 10 according to the present invention "wraps" the application code 5a on the client 3a with the application code 5b on the server 2a, and provides the capability to debug the application code 5b on the server 2a from a remote location. The remote debugging system 10 comprises a server component 11 which is installed on the server 2a and a client component 12 which is installed on the client system 3a.

Figure 2:
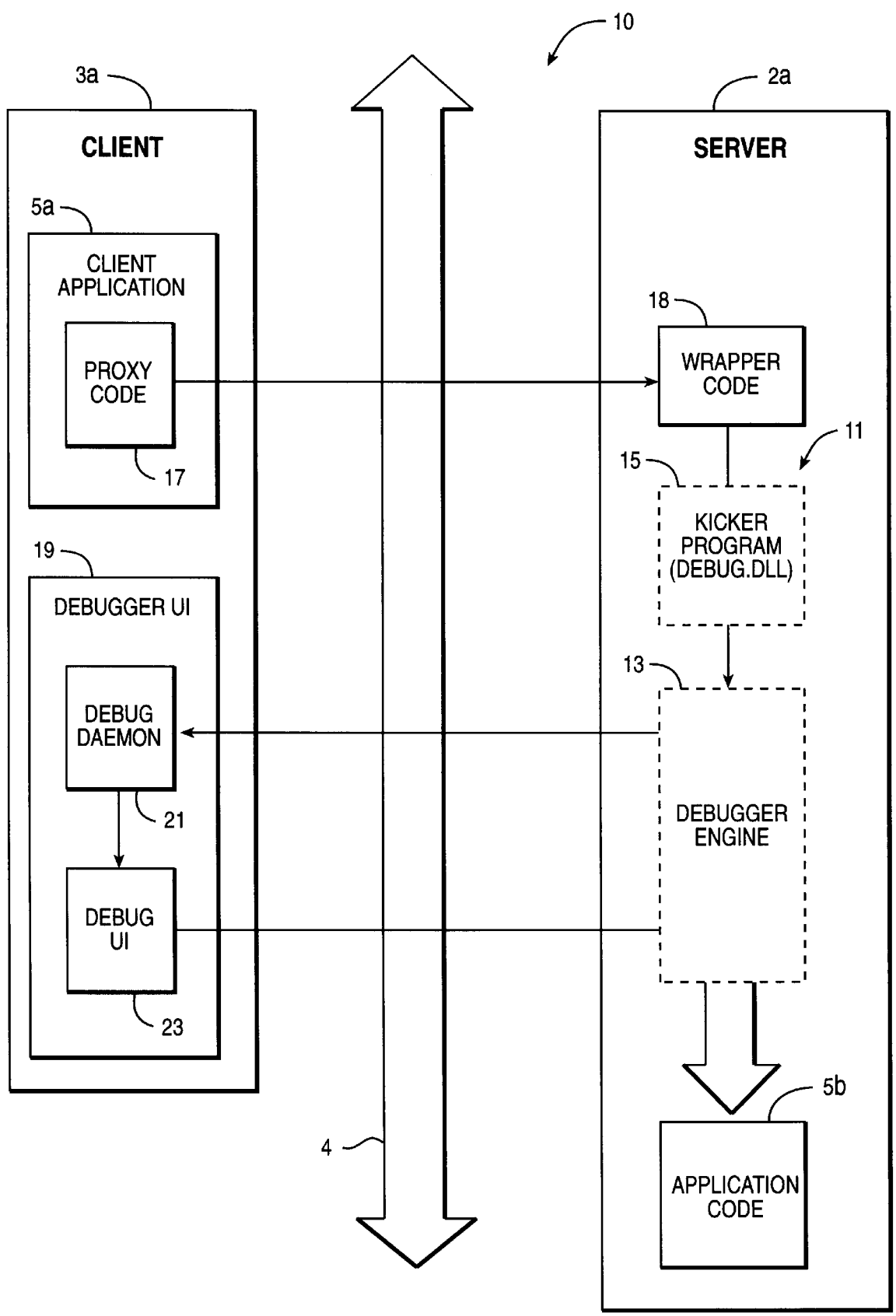
FIG. 2 shows in diagrammatic form a system for remotely debugging client/server applications according to the present invention.

Reference is next made to FIG. 2 which shows the remote debugging system 10 in more detail. The server component 11 comprises a debugger engine 13 and a kicker program 15. The client component 12 comprises a proxy code module 17 and a debugger user interface 19. The debugger user interface (UI) may be installed on the same client machine 3a as the proxy code 17 or on another client machine 3c.

As shown in FIG. 2, the debugger UI 19 comprises a debug daemon 21 and a debug user interface 23. The debug user interface 23 comprises a conventional debugger user interface which displays debug, i.e. trace, information to the program developer and also preferably provides the capability to change variable values, e.g. registers and memory. The implementation of the debug user interface 23 will be within the understanding of those skilled in the art and may comprise a known debugger product, such as the Single User Interface (SUI) in the IBM VisualAge(TM) debugger product.

The debug daemon 21 is a program which runs in the background on the client machine 3a (or the machine on which the debugger UI 19 is installed). The debug daemon 21 provides an interface between the debugger engine 13 and the debug user interface 23. The debug daemon 21 allows the debugger engine 13 to remotely start the debugger UI 19 on the client machine 3a. The debug daemon 21 also receives debugging information, for example, disassembled instructions and variable values, from the debugger engine 13 and passes them to the debug user interface 23. The debug user interface 23, in turn, displays the debug information for the user/developer. The debug user interface 23 preferably provides the developer with the capability to change the values of selected variables in the application code 5b and continue "stepping" through the execution of the code 5b on the server 2a.

The proxy code module 17 performs the function of the wrapper code 8a for remote procedure calls as described above. In addition, the proxy code module 17 includes code for querying the network address of the client machine 3 and passing the network address to the server 2 together with the call to the application code 5b. Each client machine 3 and server 2 will have a network address to provide an identity on the network 4. As will be described below, the network address of the client machine 3 is used by the debugging system 10 to start the debugger UI 19.

Shown in FIG. 2, the debugger system lo includes a wrapper code module 18 on the server 2a. The wrapper code module 18 is similar to the wrapper code 8b, i.e. the wrapper code 18 provides a communication interface for remote calls, but has been modified to operate with the debug DLL 15. The wrapper code 18 is implemented to take the network address of the client machine 3a from the proxy code 17. The wrapper code 18 passes the client's network address to the kicker program 15.

The wrapper code 18 on the server 2a includes code which tries to load the kicker program 15 each time the wrapper code 18 is called by the proxy code 17 from a client machine 3. If the kicker program 15 is successfully loaded by the wrapper code 18, then as will be described below the kicker program 15 is called just prior to the application code 5b being invoked. This call passes information including the network address of the client machine 3 to the kicker program 15. The wrapper code 18 also includes code to call the kicker program 15 after the application code 5b on the server 3a completes. The same information that was passed on "before" the call is passed on "after" the call. This operation ensures that the calls are paired.

The kicker program 15 comprises a small program which is preferably implemented as a Dynamic Link Library (i.e. DLL) which is supplied with the debugger engine 13. The kicker program 15 is implemented to perform the following functions: (1) starting the debugger engine 13 and passing a current process ID (for the application code 5b) to the debugger 13; (2) waiting for the debugger engine 13 to start and attach to the application code 5b resident on the server 3a; (3) issuing a debugger_start_error for the wrapper code module 18 if the debugger engine 13 fails to attach the application code 5b within a predetermined time duration; (4) transferring information (e.g. variables in the application program 5) obtained from the wrapper code to the debugger engine 13.

It will be understood that there is a delay on the first attempt to start the debugger engine 13. If the debugger engine 13 cannot be started, the kicker program 15 issues the debugger_start_error and on subsequent calls by the proxy code 17 from the client 3a, the application code 5b runs as if the debugging operation was not selected.

The kicker program 15 has two entry points that are used by the wrapper code 18 on the server 2a. Both of the entry points accept the same parameters. The first entry point is called prior to the calling of the application code 5b on the server 2a. The second entry point is called after the application code 5b has returned. The entry points are described in further detail below.

The debugger engine 13 according to the present invention includes code for identifying the application programs, i.e. 5, 6 or 7, during start-up that are to be debugged. The debugger 13 looks at a system list of all the programs that were loaded and identifies the kicker program 15 which, if loaded, is included in the system list. When the debugger 13 sees the name of the kicker program 15, the debugger 13 identifies the call as a remote procedure/method debugger session. This feature allows a remote debugging session to be automatically initiated when a call is made to the application code on the server from one of the client machines 3.

The debugger engine 13 includes code for initiating a request to start and connect to the remote debugger UI 19. The debugger 13 starts the remote debugger UI 19 using the network address which is stored in the kicker program 15 and passed to the debugger engine 13. The debugger engine 13 connects to the remote debugger UI 19 through the debug daemon 21.

The debugger engine 13 includes code which modifies a variable in the kicker program 15 indicating that the debugger engine 13 has started and successfully attached to the application code 5b to be debugged.

The debugger engine 13 includes code for adding two internal breakpoints in the kicker program 15. The breakpoints are used by the debugger 13 to gain control of the application code 5b. Whenever the two entry points of the kicker program 15 are called by the wrapper code 18, the debugger 13 gains control of the application 5b. Using the breakpoints, the debugger engine 13 is notified for the rest of the debug session that the application code 5b is about to be called or has just returned from processing.

The debugger engine 13 includes code to "step" the application code 5a until it reaches the application code 5b on the server 2a. (The application code 5a on the client 3 was stopped when the debugger 13 attached to the process, i.e. application code 5b on the server 2a.) The debugger engine 13 also includes code to present the application code 5b on the remote debugger UI 19.

Once the debugger engine 13 is in control of the application code 5b, the developer is free to debug the code 5b using the source level functions of the debugger 13. In a typical session, the developer will either step out of the application code 5b or select to run the application code 5b. In either instance, the wrapper code 18 calls the kicker program 15 after the application code 5b returns control. When the debugger engine 13 is notified of the second internal breakpoint, the debugger 13 goes into run mode and the server 2a resumes normal processing.

The debugger engine 13 then waits for another debug request. If another debug request comes to the server 2a, the wrapper code 18 attempts to load the kicker program 15, but because the kicker program 15 is already loaded and nothing is done. The kicker program 15 has kept track of the fact that the debugger 13 has already been started. Then by means of the internal breakpoint, the debugger engine 13 is notified that the application code 5b is to be called by the wrapper code 18. The kicker program 15 checks to make sure that each call matches the parameters of the initial request. This check ensures that a different client, e.g. 3b, does not attempt to start debugging session.

The implementation of the remote debugger system 10 for client/server applications will now be described in more detail, and particularly in the context of the IBM Component Broker Series(TM) (CBS) and VisualAge debugger products running on the Microsoft NT(TM) platform.

The kicker program 15 is preferably implemented as a Dynamic Link Library and in the following description the kicker program 15 is referred to as the debug.dll 15. The debug.dll is preferably supplied with the VisualAge debugger product and according to the invention, the debug.dll 15 is implemented with the following functions.

The debug.dll 15 is loaded on the server machine 2 by the implementation binding code which is produced by the builder. Once loaded, the following entry points: (1) _DBG_Start(parms); and (2) _DBG_Stop(parms) can be called in the debug.dll 15. As described above, the entry points are used to notify the debugger engine 13 that application code is to be called/returned and thereby the operation of the debugger engine 13 is controlled for debugging the application code.

The first entry point _DBG_Start(parms) is used to pass the following parameters: (a) the network or IP address of the client machine 3 that started the request to the server 2; (b) the Process ID (PID) of the client machine 3 that started the request to the server; (c) the Thread ID (TID) of the client machine 3 that started the request; (d) the network or IP address of the client machine 3 where the debugger UI 19 is to be remotely started; and (e) optionally, a port number identifying the port on which the debugger UI 19 is listening.

The parameters for the second entry point, _DBG_Stop (parms), are identical to the parameters passed on the _DBG_Start() call. The debugger 13 uses this feature to match calls thereby ensuring that the debugger engine 13 only talks to one client machine 3, i.e. debugger UI 19, at a time. If the server 2 receives another request from a different client, e.g. machine 3b, the IP address will not match. The debugger 13 rejects the debug request and no debugging session is initiated, and the application continues to run in normal mode. The application program interfaces (API's) for the _DBG Start() and _DBG_Stop() entry points can include code to generate a debug error code for the "mismatched" application which made the call.

As described above a function of the kicker program 15 (i.e. debug.dll) is to start the debugger engine 13. The debug.dll 15 looks for the debugger engine 13 on the __DBG__Start() API call. If the debugger engine 13 has not started, then the debug.dll 15 starts the engine 13. It is preferable that the implementation binding code (i.e. wrapper code 18) puts the call to the __DBG__Starto API as close as possible to the actual call in the application code.

For the Microsoft Windows(TM) and AIX platforms, the "attach" function can be utilized to start the debugger engine 13 and attach to a running process for debugging. Once the debugger engine 13 is initiated, the debug.dll 15 waits for the engine 13 to start-up and get control. Preferably, the debug.dll includes code for timing out and returning an error code in the API if the debugger 13 cannot be started. Once control of the process is gained, the debugger engine 13 checks if the debug.dll 15 is loaded. If the debug.dll 15 is loaded, then the debugger engine 13 begins automatic step debug until the application code 5b is reached. This feature allows the debugger engine 13 to skip the "glue code" and takes the developer directly to the application code 5b.

After the developer has finished debugging the application code 5b (via the debug UI 19), control returns to the implementation binding code (i.e. wrapper code 18). The binding code includes code to call the __DBG__Stop() entry point. In response to the entry point call, the debugger engine 13 stops debugging the application code 5b and allows the process to run.

The flow of processing control may be summarized as follows with reference to FIGS. 1 and 2:

(1) The user/developer runs the application 5a on the client machine 3a and the application 5a makes a remote method call to the application code 5b running on the server 2a. (The application code 5a could also be under the control of the debugger but since the debugging of the client application code 5a and the remote application code 5b will require separate debuggers, they run independently.

(2) The proxy code 17 on the client machine 3a looks for environment settings for the network address or IP and port number where the debugger UI 19 is to be started. This information is passed with the request to the server 2a.

(3) The wrapper code 18 (i.e. implementation binding code) on the server 2a loads the debug.dll 15 (i.e. kicker program). This is implemented by "building" the binding code with the debug enabled as will be within the understanding of one skilled in the art.

(4) Just before calling the application code 5b to be debugged, the wrapper code 18 makes a call to the first entry point, __DBG__Start(). This call passes the network or IP address, port number and the other parameters described above from the client machine 3a to the debug.dll 15.

(5) If the debugger engine 13 is not already running, the debug.dll 15 starts the debugger 13 in a separate process. The debug.dll 15 also passes the name of the process ID and optionally the IP address of the client that started the method call to the application code 5b on the server 2a. The debug.dll 15 waits for the debugger 13 to start and attach to the process. The debugger 13 automatically steps to the application code 5b and begins transferring debugging information to the debugger user interface 19 on the client machine 3a, and the debugger UI shows the developer the first executable line in the application code 5b running on the server 2a.

(6) The link between the debugger UI 19 and the debugger engine 13 allows the user/developer to step through and interact with application code 5b running remotely on the server 2a. Once the developer has stepped through the application code 5b on the server 2a, the wrapper code 18 (i.e. implementation binding) gains control and issues a call __DBG__Stop() to stop the debugger 13. The debugger engine 13, in turn, runs the application code 5b and the process returns to normal operation, i.e. no debugging.

Preferably, the debugging system 10 includes the capability to "step debug", i.e. skip over "glue" code which is added to the application code 5 to allow the applications 5 to talk to objects whether the objects are local or remote. For remote calls, the application 5a will include proxy code 17 to allow the local application code 5a to interact with objects (i.e. application code) resident on the remote server 2a. Similarly, at the server 2a there is the wrapper code 18 which the developer will not normally want to see when source level debugging.

According to this aspect of the invention, the "step debug" feature allows the debugger to step over "glue" code that does not have debug information. The debugger engine 13 is implemented to step through non-debuggable (ie. "glue") code until a return is reached or the debugger 13 steps into debuggable code.

The function __debug__start() includes a timeout for invoking the debugger engine 13. The default timeout is set at 60 seconds, and can be modified at run-time using an environment variable "IVB__DBG__TIMEOUT" as will be understood by those skilled in the art.

On the debugger side, the debug.dll waits for the variable debug__timeout to reach −1. The variable is initialized to 60, and ticks down to 0 in 1 second sleep() calls. If the debugger hasn't taken control of the process within the timeout period, the function __debug__start() returns an error code.

The debug.dll also includes two empty, static functions debug begin() and debug end(). The functions are used by the debugger engine 13 to set internal breakpoints as described above.

As also described above, the debugging system 10 allows the user/developer to call a remote application 5b and have the debugger engine 13 automatically start the debugger UI 19 on the specified client machine 3. This feature can be extended to provide multiple debugging sessions on the debugger UI 19 and multiple machines 3 can be configured as the machine 3 for the debugger UI 19.

To provide this, the developer starts up the debug daemon (s) 21 on the debugger UI client machine(s) 3, or the daemons 21 may be started at the system start-up time. The debug daemon 21 next determines the network port number, i.e. network address, for the client machine 3 by looking for the port number specified on the command line, or by reading the port number from the services file.

Next, the proxy code 17 on the client machine 2a determines the host and the port number of the debug daemon as follows. The proxy code 17 reads and sends the host and port number which are defined by an environment variable, e.g. DEBUG__UICLIENT. The environment variable definition is needed where the proxy code 17 and the debugger UI 19 reside on different client machines 2a, 2b. If there is no environment variable, the proxy code 17 attempts to obtain the local host name and port number from a TCP/IP services file. This arrangement is suitable when the proxy code 17 and the debugger UI 19 are located on the same client machine 3. If there is no entry in the services file, then the proxy code 17 sends the local host name and 0 for the port number.

As described above, when the server 3a receives the remote method call, the wrapper code 18 attempts to load the debug.dll 15. Once the debug.dll 15 is loaded, the debugger engine 13 is started and the debug.dll 15 passes the host name and port number of the debug daemon 21, client context information (comprising client address, client port number, client process ID, client thread ID), the server process ID, and the thread ID to the debugger engine 13.

Once the debugger engine 13 is started, the engine 13 allocates a socket and opens a connection to the debug daemon 21 on the client machine 3*a*. The debugger engine 13 sends the debug daemon 21 the following information: (1) the port number the debugger engine 13 is listening on; (2) the server address; (3) the process ID (PID) of the server process to be debugged; (4) the client context information comprising client address, client PID and client TID. The debugger engine 13 then waits for an initialization message from the debugger UI 23.

Once the debug daemon 21 is started, the daemon 21 keeps listening to the socket from the debugger engine 13. When the daemon 21 receives a connect message from the debugger engine 13, the daemon 21 invokes the UI 23 with the host name of the debugger engine 13, the port number and the process ID of the server process to attach to. The debugger UI 23 then executes a conventional remote connection to the debugger engine 13. The developer is free to debug the application code 5*b* resident on the server 2*a* using known techniques.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A debugging system for a networked computer system having a server machine, one or more client machines having means for initiating a call to the server machine and a network for transferring information between the server machine and the client machines, said debugging system comprising:
    (a) processing means for processing calls from said client machines to an application program on said server machine by initiating an associated program on said server having a dynamic link library, said processing means separate from said application program and including means for automatically invoking said application program by said associated program having said dynamic link library and means for returning from said application program, and said means for invoking including means for generating a first control output prior to said application program being invoked, and said means for returning including means for generating a second control output after said application program returns;
    (b) debugging means for debugging the application program on said server machine;
    (c) controller means for controlling said debugging means, said controller means including means responsive to said first control output from said processing means for initiating operation of said debugging means and means responsive to said second control output from said processing means for terminating operation of said debugging means;
    (d) said means for initiating operation of said debugging means including means for passing information to said debugging means for identifying the application program to be debugged.

2. The debugging system as claimed in claim 1, further including a debugging user interface installed on one of said client machines, and said controller means including remote activation means for activating said debugging user interface from said server system and transferring debugging information to said debugging user interface.

3. The debugging system as claimed in claim 2, wherein said remote activation means includes means for receiving an identifier for the client machine with the debugging user interface.

4. The debugging system as claimed in claim 3, wherein said identifier is received by said processing means from the client machine, and passed to said remote activation means.

5. The debugging system as claimed in claim 2, wherein said debugging means includes means for detecting said controller means on said server machine and means for initiating a remote debugging session in response to a call being made to the application program on the server machine.

6. The debugging system as claimed in claim 1, wherein said processing means includes means for activating said controller means in response to a call being received from one of said client machines.

7. The debugging system as claimed in claim 1, wherein said controller means comprises a dynamic link program loaded on the server machine, and including means for receiving information from said processing means and means for transferring selected information to said debugging means.

8. The debugging system as claimed in claim 7, wherein said client machine includes a debug daemon and a debugging user interface, said debug daemon being responsive to control information received from said debugging means and including means for activating said debugging user interface in response thereto.

9. The debugging system as claimed in claim 8, wherein said debug daemon and said debugging user interface are installed on a client machine other than the client machine initiating the call.

10. A method for remotely debugging an application program in a networked computer system having a server machine, one or more client machines having means for initiating a call to the application program on the server machine and a network for transferring information between the server machine and the client machines, said method comprising the steps of:
    (a) initiating a call from the client machine to the application program on the server machine;
    (b) processing said call to the application program on the server machine by initiating a separate associated program having a dynamic link library, said processing including automatically invoking a debugging session by said separate associated program having said dynamic link library for the application program on the server machine, said debugging session being invoked prior to execution of the application program on the server machine;
    (c) terminating the debugging session upon execution of the application program.

11. The method as claimed in claim 10, wherein said step of invoking a debugging session on the application program further includes activating a debugging user interface on a client machine for monitoring said debugging session.

12. The method as claimed in claim 11, wherein the step of invoking the debugging session comprises starting a debugging engine on the server machine and directing the debugging engine to the application program.

13. The method as claimed in claim 11, wherein the call from said client machine includes information about said client machine and information about the location of the debugging user interface.

14. The method as claimed in claim 11, wherein said processing step includes the step of identifying the presence of a control program on the server machine, and in response to the presence of the control program invoking the debugging session on the next call to the application program from a client machine.

15. A computer program product for use in a networked computer system having a server machine, one or more client machines having means for initiating a call to the server machine and a network for transferring information between the server machine and the client machines, said computer program product comprising:

a recording medium;

means recorded on said medium for instructing said computer system to perform the steps of, (a) initiating a call from the client machine to the application program on the server machine;

(b) processing said call to the application program on the server machine by initiating a separate associated program on said server having a dynamic link library, and said processing including automatically invoking a debugging session for the application program by said separate associated program having said dynamic link library on the server machine, said debugging session being invoked prior to execution of the application program on the server machine;

(c) terminating the debugging session upon execution of the application program.

* * * * *